(12) United States Patent
Miyazaki et al.

(10) Patent No.: US 11,228,198 B2
(45) Date of Patent: Jan. 18, 2022

(54) CHARGING DEVICE

(71) Applicant: FDK CORPORATION, Tokyo (JP)

(72) Inventors: Masatsuru Miyazaki, Tokyo (JP); Norio Fukui, Tokyo (JP)

(73) Assignee: FDK CORPORATION, Tokyo (JP)

(*) Notice: Subject to any disclaimer, the term of this patent is extended or adjusted under 35 U.S.C. 154(b) by 197 days.

(21) Appl. No.: 16/498,382

(22) PCT Filed: Jan. 31, 2018

(86) PCT No.: PCT/JP2018/003260
§ 371 (c)(1),
(2) Date: Sep. 26, 2019

(87) PCT Pub. No.: WO2018/179809
PCT Pub. Date: Oct. 4, 2018

(65) Prior Publication Data
US 2020/0036211 A1 Jan. 30, 2020

(30) Foreign Application Priority Data
Mar. 27, 2017 (JP) .............................. JP2017-061187

(51) Int. Cl.
*H02J 7/02* (2016.01)
*H02J 7/00* (2006.01)
(Continued)

(52) U.S. Cl.
CPC ............ *H02J 7/022* (2013.01); *H01M 10/44* (2013.01); *H02J 7/06* (2013.01); *H02M 7/06* (2013.01)

(58) Field of Classification Search
CPC ...... H02J 7/022; H02J 7/06; H02J 7/00; H02J 7/02; H01M 10/44; H02M 7/06; Y02E 60/10
See application file for complete search history.

(56) References Cited

U.S. PATENT DOCUMENTS

| | | | |
|---|---|---|---|
| 9,095,729 B2* | 8/2015 | John | H04B 5/0037 |
| 2012/0206096 A1* | 8/2012 | John | H02J 50/10 |
| | | | 320/108 |

(Continued)

FOREIGN PATENT DOCUMENTS

| JP | 2003088111 A | 3/2003 |
|---|---|---|
| JP | 2005237146 A | 9/2005 |

(Continued)

OTHER PUBLICATIONS

English Translation of International Search Report dated Apr. 17, 2018, for corresponding PCT Application No. PCT/JP2018/003260.

*Primary Examiner* — Vuthe Siek
(74) *Attorney, Agent, or Firm* — Kinney & Lange, P.A.

(57) ABSTRACT

A charging device according to the present invention includes a rectifier circuit which rectifies AC power output by an AC power supply, a DC-DC converter which converts a voltage of DC power output by the rectifier circuit, a charging circuit which includes a positive electrode contact point in contact with a positive electrode terminal of a mounted secondary battery and a first negative electrode contact point and a second negative electrode contact point in contact with a negative electrode terminal of the secondary battery, an output voltage from the DC-DC converter being applied between the positive electrode contact point and the first negative electrode contact point, and a control circuit which includes a photocoupler that is turned on by a difference in potential between the positive electrode contact point and the second negative electrode contact point and outputs an enable signal for the DC-DC converter when the photocoupler is on.

5 Claims, 5 Drawing Sheets

(51) Int. Cl.
*H01M 10/44* (2006.01)
*H02M 7/06* (2006.01)
*H02J 7/06* (2006.01)

(56) References Cited

U.S. PATENT DOCUMENTS

2014/0312691 A1   10/2014  Doljack et al.
2017/0085183 A1*   3/2017  Notsch .............. H02M 3/33569

FOREIGN PATENT DOCUMENTS

| | | |
|---|---|---|
| JP | 2011223669 A | 11/2011 |
| JP | 2013070453 A | 4/2013 |
| JP | 2015065736 A | 4/2015 |
| JP | 2016181979 A | 10/2016 |
| WO | 2011083886 A1 | 7/2011 |

* cited by examiner

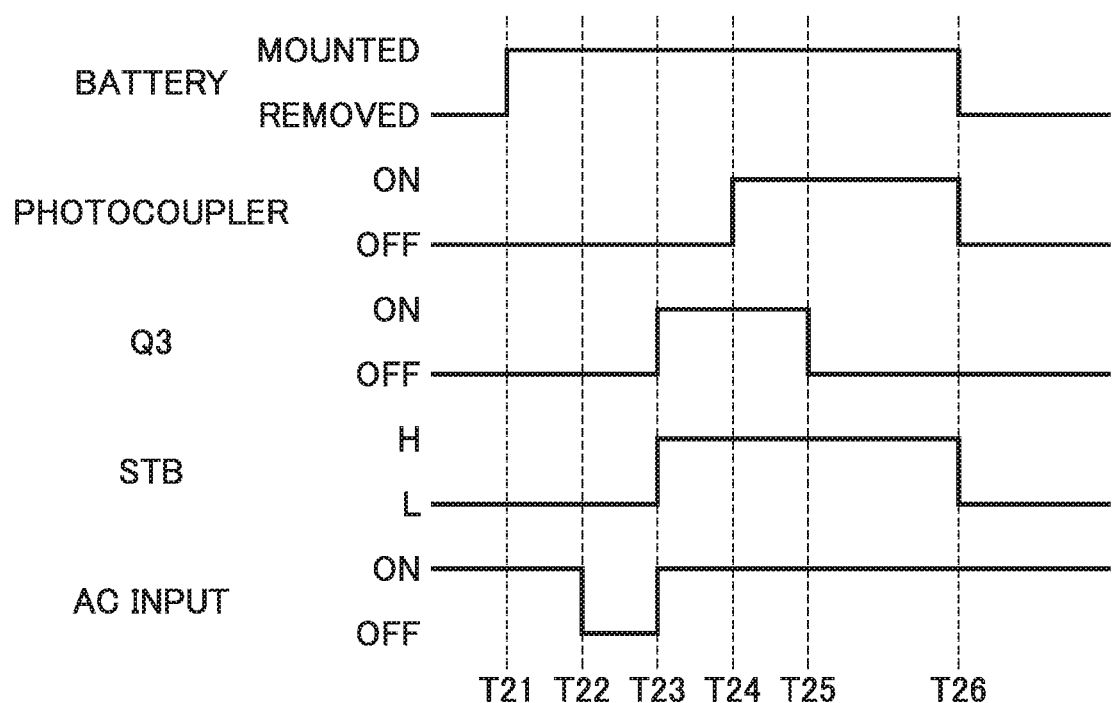

CHARGING DEVICE

CROSS-REFERENCE TO RELATED APPLICATION(S)

The present application is the national phase of PCT Application No. PCT/JP2018/003260 filed on Jan. 31, 2018, which in turn claims priority to Japanese Application No. 2017-061187 filed on Mar. 27, 2017, both of which are incorporated by reference herein in their entireties.

TECHNICAL FIELD

The present disclosure relates to a charging device for charging a secondary battery.

BACKGROUND ART

Secondary batteries, such as a nickel-hydrogen secondary battery and a lithium-ion secondary battery, can be repeatedly used by being charged and are widely used in various electronic devices. For example, a charging device which operates using a commercial AC power supply for household use as a power source is widely used as equipment which charges a secondary battery. As an example of the charging device, for example, a charging device, on which a secondary battery compatible with dry batteries is mounted and which charges the secondary battery, is publicly known (see, for example, Patent Document 1). For example, a charging device which is connected to an electronic device, such as a smartphone or a tablet PC, via a USB cable or the like and charges a secondary battery built into the electronic device is also publicly known.

PRIOR ART DOCUMENT

Patent Document

Patent Document 1: Japanese Patent Laid-Open No. 2016-181979

SUMMARY

When a conventional common charging device is connected to a commercial AC power supply, an internal DC-DC converter is operating in the charging device even if a secondary battery is not mounted on or connected to the charging device. Therefore, the charging device always consumes power, albeit very little. Such power consumption is a waste even if a consumed amount is very small and is becoming non-negligible in terms of energy saving. For this reason, it can be said to be fundamentally desirable to connect a charging device to a commercial AC power supply only at the time of charging a secondary battery. However, in actuality, a charging device is often left connected to a commercial AC power supply without a mounted or connected secondary battery.

The present disclosure has been made in view of the above-described circumstances. An object of the present disclosure is to provide a charging device low in wasteful power consumption.

In order to achieve the above object, a charging device according to the present disclosure includes a rectifier circuit which rectifies AC power output by an AC power supply, a DC-DC converter which converts a voltage of DC power output by the rectifier circuit, a charging circuit which includes a positive electrode contact point in contact with a positive electrode terminal of a mounted secondary battery, and a first negative electrode contact point and a second negative electrode contact point in contact with a negative electrode terminal of the secondary battery, an output voltage from the DC-DC converter being applied between the positive electrode contact point and the first negative electrode contact point, and a control circuit which includes a switch circuit that is turned on by a difference in potential between the positive electrode contact point and the second negative electrode contact point and outputs an enable signal for the DC-DC converter when the switch circuit is on.

According to the present disclosure, it is possible to provide a charging device low in wasteful power consumption.

BRIEF DESCRIPTION OF THE DRAWINGS

FIG. 9 is a timing chart showing operation of the charging device according to the third embodiment.

DETAILED DESCRIPTION

Embodiments of the present disclosure will be described below with reference to the drawings.

Note that the present invention is not particularly limited to the embodiments to be described below and that it will be appreciated that various modifications can be made without departing from the scope of the invention as set forth in the claims.

<First Embodiment>

A configuration and operation of a charging device 100 according to a first embodiment will be described with reference to FIGS. 1 to 4.

Figure 1:
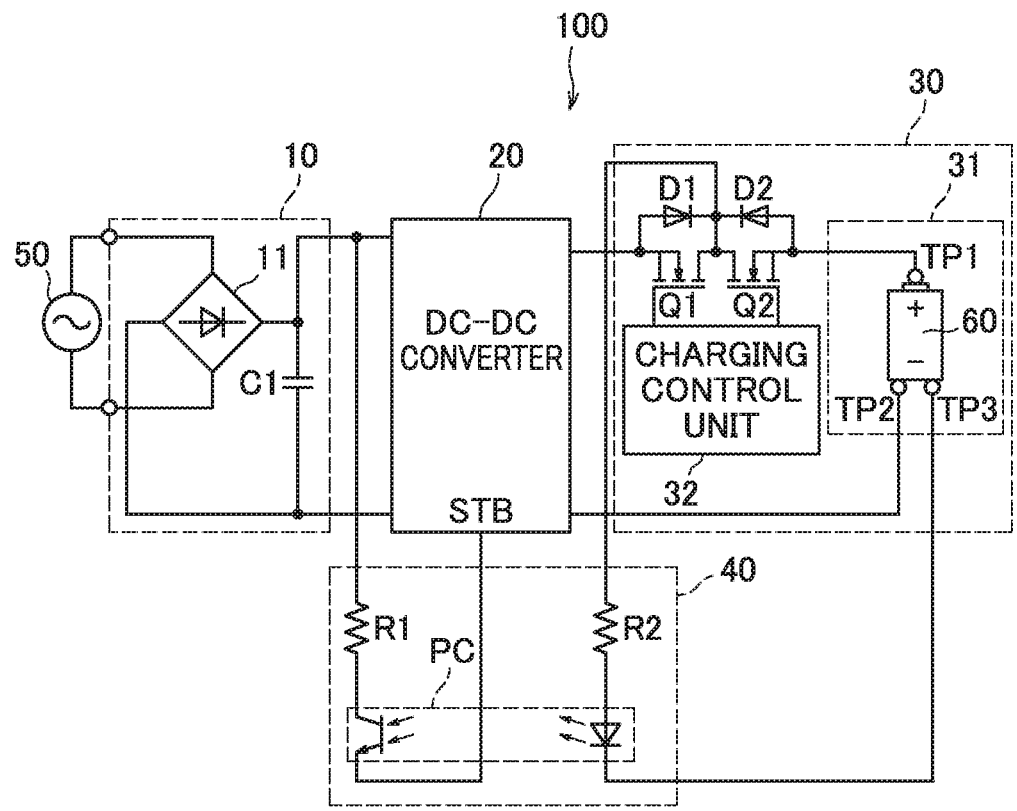
FIG. 1 is a circuit diagram of a charging device according to a first embodiment.

FIG. 1 is a circuit diagram of the charging device 100 of the first embodiment.

The charging device 100 of the first embodiment includes a rectifier circuit 10, a DC-DC converter 20, a charging circuit 30, and a control circuit 40.

The rectifier circuit 10 is a circuit which rectifies AC power output by an AC power supply 50 and is a single-phase bridge type full-wave rectifier circuit including a diode bridge 11 and a smoothing capacitor C1. The DC-DC converter 20 is a constant-voltage power supply which converts a voltage of DC power output by the rectifier circuit 10. The DC-DC converter 20 has a standby terminal STB. The DC-DC converter 20 is in a quiescent state or a stopped state when a predetermined voltage is not applied to the standby terminal STB and operates when the predetermined voltage (an enable signal) is applied to the standby terminal STB. Although the DC-DC converter 20 is, for example, an insulated type DC-DC converter, the DC-DC converter 20 is not particularly limited to this and may be, for example, a non-insulated type DC-DC converter.

The charging circuit 30 is a circuit which charges a secondary battery 60 with an output voltage from the DC-DC converter 20. The charging circuit 30 includes a battery mount 31, a charging control unit 32, a first field-effect transistor Q1, a second field-effect transistor Q2, and diodes D1 and D2.

The secondary battery 60 is mounted on the battery mount 31. The battery mount 31 includes a positive electrode contact point TP1 which is in contact with a positive electrode terminal of the mounted secondary battery 60 and a first negative electrode contact point TP2 and a second negative electrode contact point TP3 which are in contact with a negative electrode terminal of the secondary battery 60. The first field-effect transistor Q1 and the second field-effect transistor Q2 are each, for example, an n-type MOSFET (Metal-Oxide-Semiconductor Field-Effect Transistor). The positive electrode contact point TP1 is connected to an output of the DC-DC converter 20 via the first field-effect transistor Q1 and the second field-effect transistor Q2. The first negative electrode contact point TP2 is connected to a ground on an output side of the DC-DC converter 20. That is, the output voltage from the DC-DC converter 20 is applied between the positive electrode contact point TP1 and the first negative electrode contact point TP2.

The charging control unit 32 is, for example, a publicly known microcomputer control circuit or control IC (Integrated Circuit) and performs on-off control on the first field-effect transistor Q1 and the second field-effect transistor Q2 in accordance with a charging status of the secondary battery 60. The charging control unit 32 preferably operates on the output voltage from the DC-DC converter 20.

A source of the first field-effect transistor Q1 is connected to the output of the DC-DC converter 20. A source of the second field-effect transistor Q2 is connected to the positive electrode contact point TP1. A drain of the first field-effect transistor Q1 is connected to a drain of the second field-effect transistor Q2. Bases of the first field-effect transistor Q1 and the second field-effect transistor Q2 are connected to the charging control unit 32. The diode D1 is, for example, a parasitic diode for the first field-effect transistor Q1 and has an anode connected to the source of the first field-effect transistor Q1 and a cathode connected to the drain of the first field-effect transistor Q1. The diode D2 is, for example, a parasitic diode for the second field-effect transistor Q2 and has an anode connected to the source of the second field-effect transistor Q2 and a cathode connected to the drain of the second field-effect transistor Q2.

In the charging circuit 30 with the above-described configuration, the secondary battery 60 is charged with the output voltage from the DC-DC converter 20 when the first field-effect transistor Q1 and the second field-effect transistor Q2 are both on. Charging of the secondary battery 60 is stopped when the first field-effect transistor Q1 and the second field-effect transistor Q2 are both off. If a short-circuit fault occurs in either the DC-DC converter 20 or the secondary battery 60 when the first field-effect transistor Q1 and the second field-effect transistor Q2 are both off, and charging of the secondary battery 60 is stopped, it is possible to prevent short-circuit current from flowing via the diodes D1 and D2 in either case. This allows securement of safety in a case where a short-circuit fault occurs in either the DC-DC converter 20 or the secondary battery 60.

The control circuit 40 includes a photocoupler PC as a switch circuit and resistors R1 and R2 and is a circuit which outputs an enable signal for the DC-DC converter 20 when the photocoupler PC is on. The resistor R1 is a resistor which limits collector current from a phototransistor and has one end connected to an output of the rectifier circuit 10 and the other end connected to a collector of the phototransistor in the photocoupler PC. An emitter of the phototransistor in the photocoupler PC is connected to the standby terminal STB of the DC-DC converter 20. A light-emitting diode of the photocoupler PC has an anode connected to one end of the resistor R2 and a cathode connected to the second negative electrode contact point TP3. The other end of the resistor R2 is connected to a juncture of the drain of the first field-effect transistor Q1 and the drain of the second field-effect transistor Q2. The resistor R2 is a resistor which limits current from the light-emitting diode of the photocoupler PC. Adoption of the above-described circuit configuration, in which an enable signal for the DC-DC converter 20 is output when the photocoupler PC is on, makes it possible to transmit an enable signal from the output side to an input side of the DC-DC converter 20 while electrical insulation between the input side and the output side of the DC-DC converter 20 is maintained.

When the first field-effect transistor Q1 and the second field-effect transistor Q2 are both off, a voltage of the secondary battery 60 is applied to the light-emitting diode of the photocoupler PC via the diode D2 to turn on the photocoupler PC. In this state, the output voltage from the DC-DC converter 20 is applied to the light-emitting diode of the photocoupler PC via the diode D1 to turn on the photocoupler PC. Thus, an enable signal for the DC-DC converter 20 is output from the photocoupler PC even when the first field-effect transistor Q1 and the second field-effect transistor Q2 are both off. For this reason, the DC-DC converter 20 operates even when the first field-effect transistor Q1 and the second field-effect transistor Q2 are both off, as long as the secondary battery 60 is mounted on the battery mount 31. Since the charging circuit 30 can be made to operate on the output voltage from the DC-DC converter 20 regardless of the charging status of the secondary battery 60, a power supply for the charging circuit 30 need not be separately provided.

Figure 2:
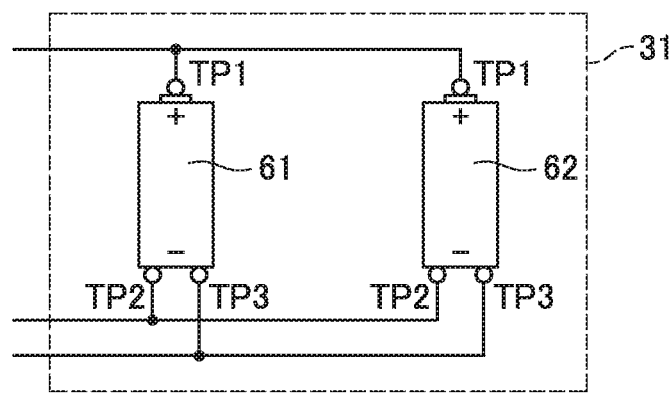
FIG. 2 is a circuit diagram showing a first modification of a battery mount.

FIG. 2 is a circuit diagram showing a first modification of the battery mount 31.

The first modification of the battery mount 31 has two positive electrode contact points TP1, two first negative electrode contact points TP2, and two second negative electrode contact points TP3 as described earlier. The two positive electrode contact points TP1 are connected in parallel, and a juncture thereof is connected to the source of the second field-effect transistor Q2. The two first negative electrode contact points TP2 are connected in parallel, and a juncture thereof is connected to the ground on the output side of the DC-DC converter 20. The two second negative electrode contact points TP3 are connected in parallel, and a juncture thereof is connected to the cathode of the light-emitting diode in the photocoupler PC.

The battery mount 31 with the above-described configuration has two secondary batteries 61 and 62 which are connected in parallel and can simultaneously charge the two secondary batteries 61 and 62. In the first modification of the battery mount 31, the DC-DC converter 20 is activated while at least one of the two secondary batteries 61 and 62 is mounted. The first modification of the battery mount 31 can charge at least one of the two secondary batteries 61 and 62 independently.

Figure 3:
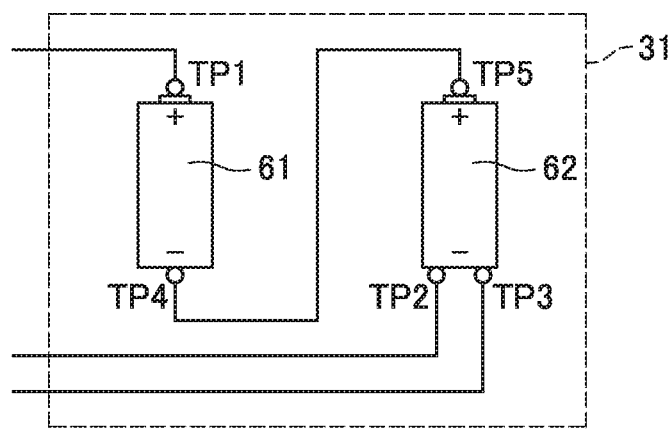
FIG. 3 is a circuit diagram showing a second modification of the battery mount.

FIG. 3 is a circuit diagram showing a second modification of the battery mount 31.

The second modification of the battery mount 31 has two contact points TP4 and TP5 in addition to the positive electrode contact point TP1, the first negative electrode contact point TP2, and the second negative electrode contact point TP3 described earlier. The positive electrode contact point TP1 is connected to the source of the second field-effect transistor Q2 and touches a positive electrode terminal of the first secondary battery 61. The contact point TP4 touches a negative electrode terminal of the first secondary battery 61. The contact point TP5 is connected to the contact point TP4 and touches a positive electrode terminal of the second secondary battery 62. The first negative electrode contact point TP2 is connected to the ground on the output side of the DC-DC converter 20. The second negative electrode contact point TP3 is connected to the cathode of the light-emitting diode in the photocoupler PC. The first negative electrode contact point TP2 and the second negative electrode contact point TP3 touch a negative electrode terminal of the second secondary battery 62.

The battery mount 31 with the above configuration has the two secondary batteries 61 and 62 connected in series and can simultaneously charge the two secondary batteries 61 and 62. As for the second modification of the battery mount 31, the DC-DC converter 20 is activated only when the two secondary batteries 61 and 62 are both mounted. The two secondary batteries 61 and 62 are always charged together.

Figure 4:
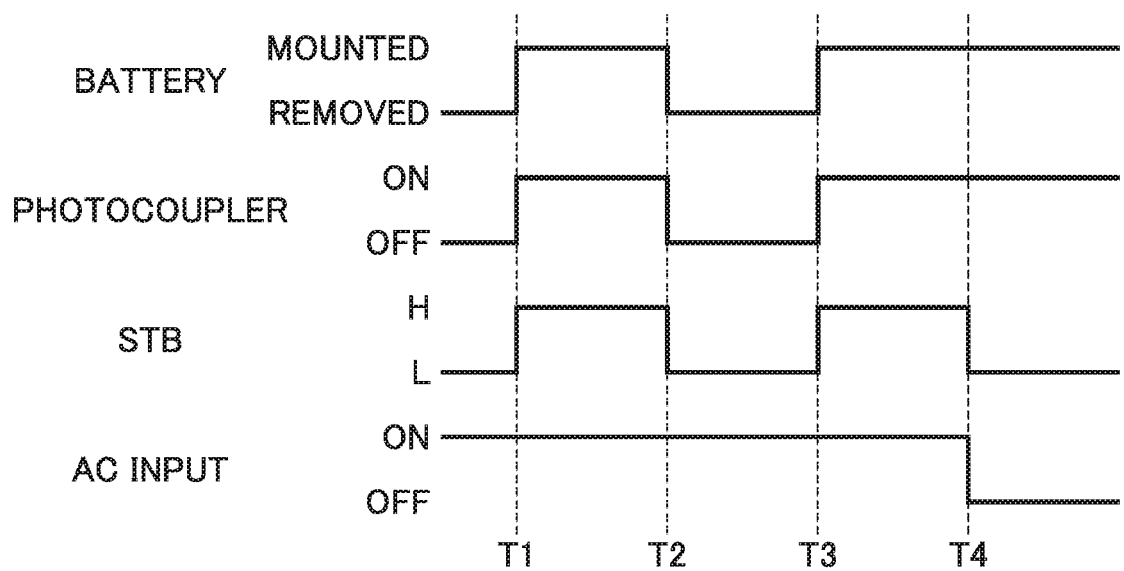
FIG. 4 is a timing chart showing operation of the charging device according to the first embodiment.

FIG. 4 is a timing chart showing the operation of the charging device 100 according to the first embodiment.

When the secondary battery 60 is mounted on the battery mount 31 (at a time T1 or a time T3), the positive electrode terminal of the secondary battery 60 comes into contact with the positive electrode contact point TP1, and the negative electrode terminal comes into contact with the first negative electrode contact point TP2 and the second negative electrode contact point TP3. In this state, since the voltage of the secondary battery 60 is applied between the positive electrode contact point TP1 and the second negative electrode contact point TP3, the photocoupler PC is turned on to output an enable signal for the DC-DC converter 20. The enable signal activates the DC-DC converter 20 in the charging device 100, and the output voltage from the DC-DC converter 20 is applied to the secondary battery 60, thereby charging the secondary battery 60. More specifically, the voltage of the secondary battery 60 mounted on the battery mount 31 causes current to flow to the light-emitting diode of the photocoupler PC, which turns on the phototransistor of the photocoupler PC. With the turn-on, the output voltage from the rectifier circuit 10 is applied to the standby terminal STB of the DC-DC converter 20, and the standby terminal STB changes to high level (an enable signal). Thus, the DC-DC converter 20 is activated.

In the above-described state, the first negative electrode contact point TP2 and the second negative electrode contact point TP3 are electrically connected via the negative electrode terminal of the secondary battery 60. For this reason, after the DC-DC converter 20 is activated, the output voltage from the DC-DC converter 20 is also applied between the positive electrode contact point TP1 and the second negative electrode contact point TP3. Thus, the control circuit 40 is maintained in a state where the photocoupler PC is on with the output voltage from the DC-DC converter 20, after the DC-DC converter 20 is activated. Since an enable signal for the DC-DC converter 20 thus continues to be output, the DC-DC converter 20 is maintained in an operating state.

Note that, if the charging device 100 enters a state of being not connected to the AC power supply 50, supply of the output voltage from the rectifier circuit 10 stops even when the photocoupler PC is on with the voltage of the mounted secondary battery 60. An enable signal is stopped from being output (at a time T4).

When the secondary battery 60 is removed from the battery mount 31 (at a time T2), application of the voltage of the secondary battery 60 between the positive electrode contact point TP1 and the second negative electrode contact point TP3 is stopped. Additionally, when the secondary battery 60 is removed from the battery mount 31, since electrical connection between the first negative electrode contact point TP2 and the second negative electrode contact point TP3 is lost, the output voltage from the DC-DC converter 20 is not applied between the positive electrode contact point TP1 and the second negative electrode contact point TP3. For this reason, the photocoupler PC is turned off, and the standby terminal STB of the DC-DC converter 20 changes to low level due to absence of application of the output voltage from the rectifier circuit 10. This brings the DC-DC converter 20 into a state where operation is stopped or quiescent. Thus, in the charging device 100 with the secondary battery 60 removed, the DC-DC converter 20 consumes little power even when the charging device 100 is left connected to the AC power supply 50.

As described above, according to the present disclosure, it is possible to provide the charging device 100 low in wasteful power consumption.

<Second Embodiment>

A configuration and operation of a charging device 100 according to a second embodiment will be described with reference to FIGS. 5 to 7.

Figure 5:
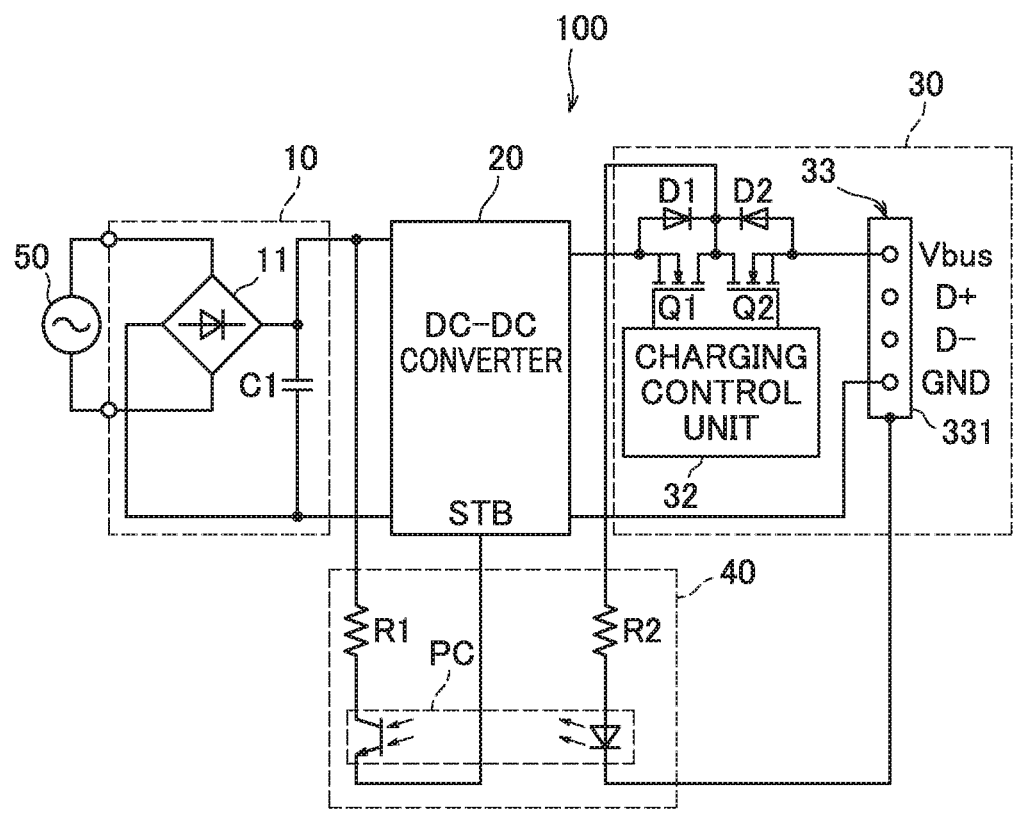
FIG. 5 is a circuit diagram of a charging device according to a second embodiment.
Figure 6:
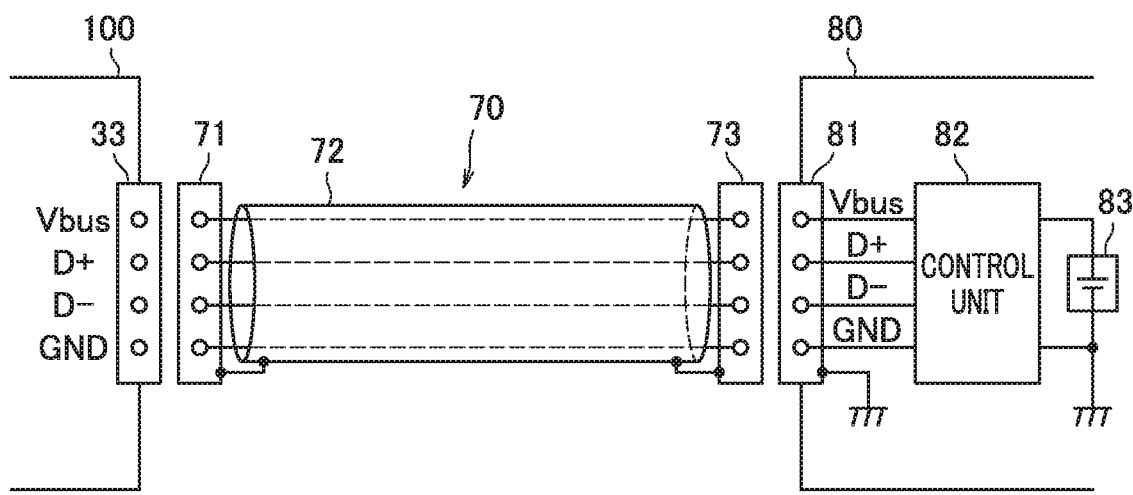
FIG. 6 is a circuit diagram showing cable connection between the charging device according to the second embodiment and an electronic device.

FIG. 5 is a circuit diagram of the charging device 100 of the second embodiment. FIG. 6 is a circuit diagram showing cable connection between the charging device 100 of the second embodiment and an electronic device 80.

The charging device 100 of the second embodiment is different from that of the first embodiment in a configuration of a charging circuit 30. More specifically, the charging device 100 of the second embodiment is different from that of the first embodiment in that a receptacle 33 is provided instead of the battery mount 31 of the first embodiment. Since other components are the same as those in the first embodiment, common components are denoted by the same reference numerals, and a detailed description thereof will be omitted.

The receptacle 33 is a receptacle compliant with the USB (Universal Serial Bus) standard and has a Vbus terminal as a power supply terminal, a D+ terminal, a D− terminal, and a GND terminal as a ground terminal. The Vbus terminal of the receptacle 33 is connected to a source of a second field-effect transistor Q2. The GND terminal of the receptacle 33 is connected to a ground on an output side of a DC-DC converter 20. That is, an output voltage from the DC-DC converter 20 is applied between the Vbus terminal and the GND terminal of the receptacle 33. A housing 331 of the receptacle 33 is connected to a cathode of a light-emitting diode in a photocoupler PC. That is, in a control circuit 40, current flows to the light-emitting diode due to a difference in potential between the Vbus terminal and the housing 331 of the receptacle 33 to turn on the photocoupler PC. At this time, an enable signal for the DC-DC converter 20 is output.

As for the D+ terminal and the D− terminal of the receptacle 33, the D+ terminal may be connected to the D− terminal and be short-circuited or pull-down may be performed by connecting each of the D+ terminal and the D− terminal to a ground via a resistor with a predetermined resistance value, although not shown.

The electronic device 80 is, for example, a smartphone or a tablet PC and includes a receptacle 81, a control unit 82, and a secondary battery 83. The receptacle 81 is a USB-compliant receptacle and has a Vbus terminal, a D+ terminal, a D− terminal, and a GND terminal. The D+ terminal and the D− terminal of the receptacle 81 are connected to the control unit 82. The Vbus terminal of the receptacle 81 is connected to a positive electrode terminal of the secondary battery 83 via the control unit 82. The GND terminal of the receptacle 81 is connected to a negative electrode terminal of the secondary battery 83 via the control unit 82. The control unit 82 is, for example, a microcomputer control device or a control IC and controls charging and discharging of the secondary battery 83.

The electronic device 80 is connected to the charging device 100 via a USB-compliant cable 70. In the cable 70, a plug 71 is connected to the receptacle 33 of the charging device 100, and a plug 73 is connected to the receptacle 81 of the electronic device 80. The Vbus terminal of the receptacle 33 is connected to the Vbus terminal of the receptacle 81 via a power supply line of the cable 70 and is thus connected to the positive electrode terminal of the secondary battery 83 in the electronic device 80. The GND terminal of the receptacle 33 is connected to the GND terminal of the receptacle 81 via a ground line of the cable 70 and is thus connected to the negative electrode terminal of the secondary battery 83 in the electronic device 80. The housing 331 of the receptacle 33 is connected to a housing of the receptacle 81 via a shield 72 of the cable 70 and is thus connected to a ground of the electronic device 80.

Figure 7:
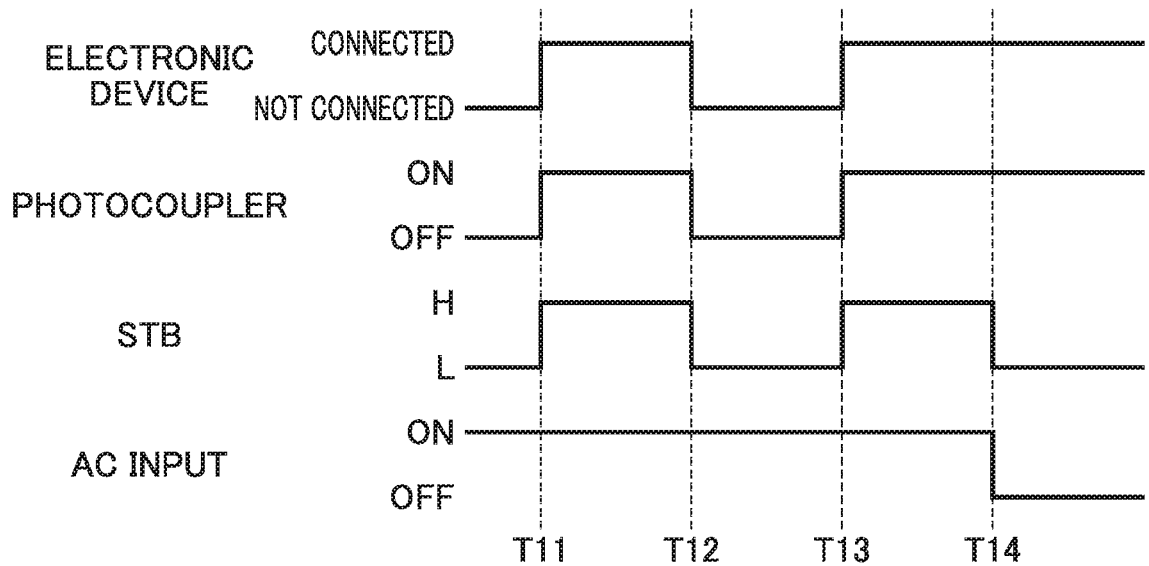
FIG. 7 is a timing chart showing operation of the charging device according to the second embodiment.

FIG. 7 is a timing chart showing the operation of the charging device 100 according to the second embodiment.

When the electronic device 80 is connected to the charging device 100 via the cable 70 (at a time T11 or a time T13), the positive electrode terminal of the secondary battery 83 is connected to the Vbus terminal of the receptacle 33, and the negative electrode terminal of the secondary battery 83 is connected to the housing 331 of the receptacle 33 via the ground of the electronic device 80. Since a voltage of the secondary battery 83 is applied between the Vbus terminal and the housing 331 of the receptacle 33 in this state, the photocoupler PC is turned on to output an enable signal for the DC-DC converter 20. The enable signal activates the DC-DC converter 20 in the charging device 100, and the output voltage from the DC-DC converter 20 is applied to the secondary battery 83, thereby charging the secondary battery 83. More specifically, the voltage of the secondary battery 83 in the electronic device 80 causes current to flow to the light-emitting diode of the photocoupler PC, which turns on a phototransistor of the photocoupler PC. With the turn-on, an output voltage from a rectifier circuit 10 is applied to a standby terminal STB of the DC-DC converter 20, and the standby terminal STB changes to high level (an enable signal). Thus, the DC-DC converter 20 is activated.

In the above-described state, the GND terminal of the receptacle 33 is connected to the housing 331 of the receptacle 33 via the ground of the electronic device 80. For this reason, after the DC-DC converter 20 is activated, the output voltage from the DC-DC converter 20 is also applied between the Vbus terminal of the receptacle 33 and the housing 331 of the receptacle 33. Thus, the control circuit 40 is maintained in a state where the photocoupler PC is on with the output voltage from the DC-DC converter 20, after the DC-DC converter 20 is activated. Since an enable signal for the DC-DC converter 20 continues to be output, the DC-DC converter 20 is maintained in an operating state.

Note that, if the charging device 100 enters a state of being not connected to an AC power supply 50, supply of the output voltage from the rectifier circuit 10 stops even when the photocoupler PC is on with the voltage of the secondary battery 83 in the electronic device 80. An enable signal is stopped from being output (at a time T14).

When the cable 70 is removed, and the charging device 100 is brought into a state of being not connected to the electronic device 80 (at a time T12), application of the voltage of the secondary battery 83 between the Vbus terminal of the receptacle 33 and the housing 331 of the receptacle 33 is stopped. Since connection of the GND terminal of the receptacle 33 to the housing 331 of the receptacle 33 is lost in this state, the output voltage from the DC-DC converter 20 is not applied between the Vbus terminal of the receptacle 33 and the housing 331 of the receptacle 33. For this reason, the photocoupler PC is turned off, and the standby terminal STB of the DC-DC converter 20 changes to low level due to absence of application of the output voltage from the rectifier circuit 10. This brings the DC-DC converter 20 into a state where operation is stopped or quiescent. Thus, in the charging device 100 without the electronic device 80 connected, the DC-DC converter 20 consumes little power even when the charging device 100 is left connected to the AC power supply 50.

As described above, according to the present disclosure, it is possible to provide the charging device 100 low in wasteful power consumption.

<Third Embodiment>

A configuration and operation of a charging device 100 according to a third embodiment will be described with reference to FIGS. 8 and 9.

Figure 8:
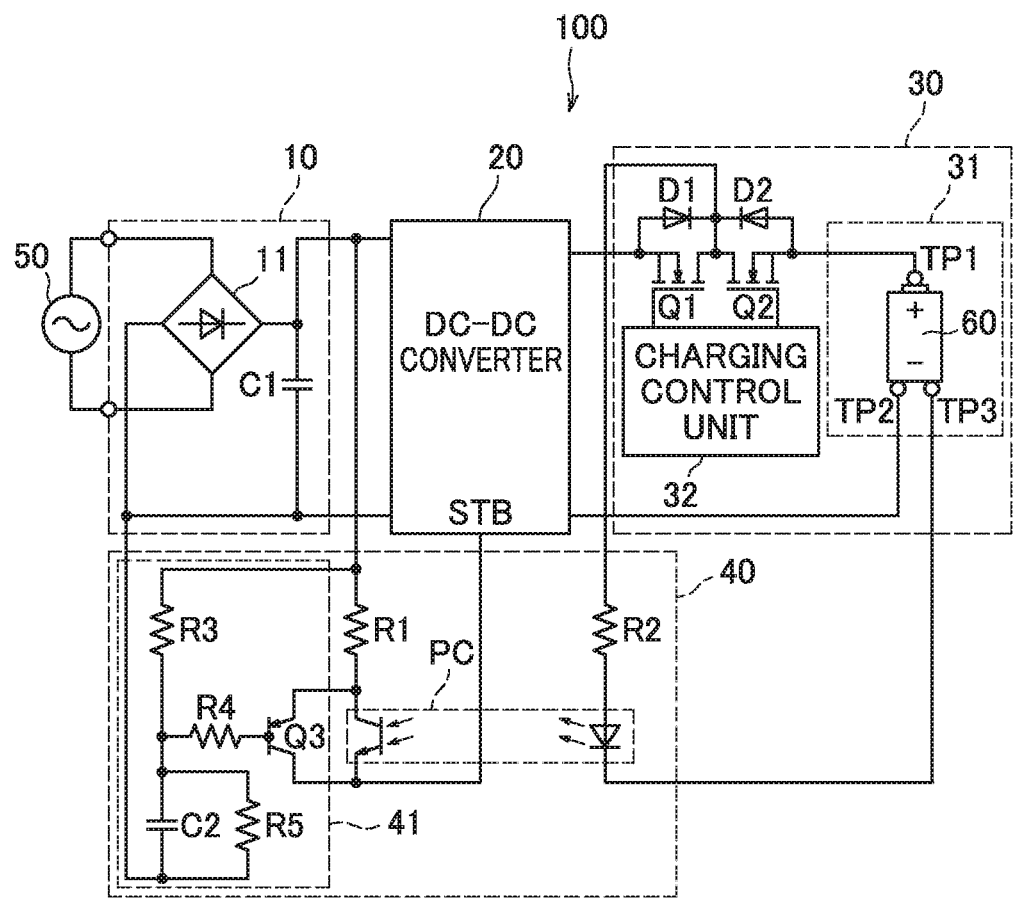
FIG. 8 is a circuit diagram of a charging device according to a third embodiment.

FIG. 8 is a circuit diagram of the charging device 100 of the third embodiment.

The charging device 100 of the third embodiment is different in a configuration of a control circuit 40 from that of the first embodiment. More specifically, the charging device 100 of the third embodiment is different from that of the first embodiment in that the control circuit 40 further includes an activation circuit 41. Since other components are the same as those in the first embodiment, common components are denoted by the same reference numerals, and a detailed description thereof will be omitted.

Note that it will be appreciated that the configuration of the control circuit 40 of the third embodiment to be described below can be applied not only to the charging device 100 of the first embodiment but also to the charging device 100 of the second embodiment.

The activation circuit 41 is a circuit which generates and outputs an enable signal only for a predetermined time period after a rectifier circuit 10 is activated and includes resistors R3 to R5, a capacitor C2, and a transistor Q3.

The resistor R3 has one end connected to the output of the rectifier circuit 10 and the other end connected to one end of the capacitor C2. The other end of the capacitor C2 is connected to a ground on an input side of the DC-DC converter 20. The resistor R3 and the capacitor C2 constitute an RC circuit. The resistor R5 is connected in parallel with the capacitor C2. The resistor R4 has one end connected to a juncture of the resistor R3 and the capacitor C2 and the other end connected to a base of the transistor Q3. The transistor Q3 is a PNP type transistor. An emitter of the transistor Q3 is connected to a collector of a phototransistor in a photocoupler PC. A collector of the transistor Q3 is connected to an emitter of the phototransistor in the photocoupler PC. The activation circuit 41 with this configuration has an extremely simple circuit configuration. The activation circuit 41 is preferable in that the charging device 100 according to the present disclosure can be implemented at lower cost.

FIG. 9 is a timing chart showing the operation of the charging device 100 of the third embodiment.

When a secondary battery 60 is mounted on a battery mount 31 (at a time T21), a positive electrode terminal of the secondary battery 60 comes into contact with a positive electrode contact point TP1, and a negative electrode terminal comes into contact with a first negative electrode contact point TP2 and a second negative electrode contact point TP3. In this state, a voltage of the secondary battery 60 is applied between the positive electrode contact point TP1 and the second negative electrode contact point TP3. However, for example, if power of the secondary battery 60 is almost depleted, the voltage of the secondary battery 60 is low, and the photocoupler PC cannot be turned on with the voltage of the secondary battery 60, since an enable signal is not output from the control circuit 40, the DC-DC converter 20 cannot be activated.

In the above-described case, for example, after an AC power supply 50 is temporarily disconnected (at a time T22), the AC power supply 50 is reconnected to reactivate the rectifier circuit 10 (at a time T23). With this reactivation, an enable signal is output from the activation circuit 41 only for the predetermined time period, and the DC-DC converter 20 can be activated.

More specifically, when the AC power supply 50 is disconnected, charge in the capacitor C2 of the activation circuit 41 is released (at the time T22). Alternatively, a reset switch (not shown) which releases the charge in the capacitor C2 may be provided, and the reset switch may be operated. When the AC power supply 50 is reconnected to reactivate the rectifier circuit 10 (at the time T23), base current for the transistor Q3 flows only for a period from when the rectifier circuit 10 is activated to when the capacitor C2 is charged to turn on the transistor Q3 (from the time T23 to a time T25). With the turn-on of the transistor Q3, an output voltage from the rectifier circuit 10 is applied to a standby terminal STB of the DC-DC converter 20. This activates the DC-DC converter 20, and the output voltage from the DC-DC converter 20 is applied to the secondary battery 60, thereby charging the secondary battery 60.

After the DC-DC converter 20 is activated, the photocoupler PC is turned on with the output voltage from the DC-DC converter 20 (at a time T24). With this turn-on, an enable signal for the DC-DC converter 20 continues to be output, and the DC-DC converter 20 is maintained in an operating state. When the secondary battery 60 is removed from the battery mount 31 (at a time T26), the photocoupler PC is turned off, and the standby terminal STB of the DC-DC converter 20 changes to low level due to absence of application of the output voltage from the rectifier circuit 10. This brings the DC-DC converter 20 into a state where operation is stopped or quiescent.

As described above, even in, for example, a case where power of the secondary battery 60 is almost depleted, the voltage of the secondary battery 60 is low, and the photocoupler PC cannot be turned on with the voltage of the secondary battery 60, the charging device 100 of the third embodiment can activate the DC-DC converter 20 and charge the secondary battery 60.

<Aspects of Present Disclosure>

A charging device according to a first aspect of the present disclosure includes a rectifier circuit which rectifies AC power output by an AC power supply, a DC-DC converter which converts a voltage of DC power output by the rectifier circuit, a charging circuit which includes a positive electrode contact point in contact with a positive electrode terminal of a mounted secondary battery, and a first negative electrode contact point and a second negative electrode contact point in contact with a negative electrode terminal of the secondary battery, an output voltage from the DC-DC converter being applied between the positive electrode contact point and the first negative electrode contact point, and a control circuit which includes a switch circuit that is turned on by a difference in potential between the positive electrode contact point and the second negative electrode contact point and outputs an enable signal for the DC-DC converter when the switch circuit is on.

In the secondary battery mounted on the charging device, the positive electrode terminal is in contact with the positive electrode contact point, and the negative electrode terminal is in contact with the first negative electrode contact point and the second negative electrode contact point. Since a voltage of the secondary battery is applied between the positive electrode contact point and the second negative electrode contact point in this state, the switch circuit is turned on to output the enable signal for the DC-DC converter. The enable signal activates the DC-DC converter in the charging device, and the output voltage from the DC-DC converter is applied to the secondary battery, thereby charging the secondary battery.

In the above-described state, the first negative electrode contact point and the second negative electrode contact point are electrically connected via the negative electrode terminal of the secondary battery. For this reason, after the DC-DC converter is activated, the output voltage from the DC-DC converter is also applied between the positive electrode contact point and the second negative electrode contact point. Thus, after the DC-DC converter is activated, the control circuit is maintained in a state where the switch circuit is on with the output voltage from the DC-DC converter, and the enable signal for the DC-DC converter continues to be output.

When the secondary battery is removed from the charging device, application of the voltage of the secondary battery between the positive electrode contact point and the second negative electrode contact point is stopped. Additionally, when the secondary battery is removed from the charging device, since electrical connection between the first negative electrode contact point and the second negative electrode contact point is lost, the output voltage from the DC-DC converter is not applied between the positive electrode contact point and the second negative electrode contact point. For this reason, the switch circuit is turned off to stop the enable signal for the DC-DC converter from being output. This brings the DC-DC converter into a state where operation is stopped or quiescent. Thus, in the charging device with the secondary battery removed, the DC-DC converter consumes little power even when the charging device is left connected to a commercial AC power supply.

As described above, according to the first aspect of the present disclosure, the operational effect of allowing provision of a charging device low in wasteful power consumption is achieved.

As for a charging device according to a second aspect of the present disclosure, in the aforementioned first aspect of the present disclosure, the switch circuit includes a photocoupler, and a light-emitting diode of the photocoupler emits light upon receiving current flowing due to the difference in potential between the positive electrode contact point and the second negative electrode contact point, and the control circuit outputs the enable signal for the DC-DC converter when a phototransistor of the photocoupler is on.

According to the second aspect of the present disclosure, it is possible to transmit the enable signal from an output side to an input side of the DC-DC converter while maintaining electrical insulation between the input side and the output side of the DC-DC converter.

As for a charging device according to a third aspect of the present disclosure, in the aforementioned second aspect of the present disclosure, the charging circuit includes a first field-effect transistor, a second field-effect transistor, and a charging control unit which performs on-off control on the first field-effect transistor and the second field-effect transistor in accordance with a charging status of the secondary battery, a source of the first field-effect transistor being connected to an output of the DC-DC converter, a source of the second field-effect transistor being connected to the positive electrode contact point, and a drain of the first field-effect transistor being connected to a drain of the second field-effect transistor, and the light-emitting diode of the photocoupler has an anode connected to a juncture of the drain of the first field-effect transistor and the drain of the second field-effect transistor and a cathode connected to the second negative electrode contact point.

The secondary battery is charged with the output voltage from the DC-DC converter when the first field-effect transistor and the second field-effect transistor are both on. Charging of the secondary battery is stopped when the first field-effect transistor and the second field-effect transistor are both off. If a short-circuit fault occurs in either the DC-DC converter or the secondary battery when the first field-effect transistor and the second field-effect transistor are both off, and charging of the secondary battery is stopped, it is possible to prevent short-circuit current from flowing via a parasitic diode for each field-effect transistor in either case.

When the first field-effect transistor and the second field-effect transistor are both off, the voltage of the secondary battery is applied to the light-emitting diode of the photocoupler via a parasitic diode for the second field-effect transistor to turn on the phototransistor of the photocoupler. In this state, the output voltage from the DC-DC converter is applied to the light-emitting diode of the photocoupler via a parasitic diode for the first field-effect transistor to turn on the phototransistor of the photocoupler. Thus, the enable signal for the DC-DC converter is output from the switch circuit even when the first field-effect transistor and the second field-effect transistor are both off. For this reason, the DC-DC converter operates even when the first field-effect transistor and the second field-effect transistor are both off, as long as the secondary battery is mounted. Since the charging circuit can be made to operate on the output voltage from the DC-DC converter regardless of the charging status of the secondary battery, a power supply for the charging circuit need not be separately provided.

As described above, according to the third aspect of the present disclosure, it is possible to secure safety in a case where a short-circuit fault occurs in either the DC-DC converter or the secondary battery and implement a charging device according to the present disclosure at lower cost.

A charging device according to a fourth aspect of the present disclosure includes a rectifier circuit which rectifies AC power output by an AC power supply, a DC-DC converter which converts a voltage of DC power output by the rectifier circuit, a charging circuit which includes a receptacle having a power supply terminal connected to a positive electrode terminal of a secondary battery in an electronic device via a power supply line of a cable and a ground terminal connected to a negative electrode terminal of the secondary battery via a ground line of the cable, a housing of the receptacle being connected to a ground of the electronic device via a shield of the cable, an output voltage from the DC-DC converter being applied between the power supply terminal of the receptacle and the ground terminal of the receptacle, and a control circuit which includes a switch circuit that is turned on by a difference in potential between the power supply terminal of the receptacle and the housing of the receptacle and outputs an enable signal for the DC-DC converter when the switch circuit is on.

While the electronic device is connected to the charging device via the cable, the power supply terminal of the receptacle is connected to the positive electrode terminal of the secondary battery in the electronic device, and the ground terminal of the receptacle is connected to the negative electrode terminal of the secondary battery in the electronic device. Additionally, the housing of the receptacle is connected to the ground of the electronic device and is connected to the negative electrode terminal of the secondary battery via the ground of the electronic device. In this state, since a voltage of the secondary battery is applied between the power supply terminal of the receptacle and the housing of the receptacle, the switch circuit is turned on to output the enable signal for the DC-DC converter. The enable signal activates the DC-DC converter in the charging device, and the output voltage from the DC-DC converter is applied to the secondary battery, thereby charging the secondary battery.

In the above-described state, the ground terminal of the receptacle is connected to the housing of the receptacle via the ground of the electronic device. For this reason, after the DC-DC converter is activated, the output voltage from the DC-DC converter is also applied between the power supply terminal of the receptacle and the housing of the receptacle. Thus, after the DC-DC converter is activated, the control circuit is maintained in a state where the switch circuit is on with the output voltage from the DC-DC converter, and the enable signal for the DC-DC converter continues to be output.

While the electronic device is not connected to the charging device via the cable, the voltage of the secondary battery is not applied between the power supply terminal of the receptacle and the housing of the receptacle. Since the ground terminal of the receptacle is not connected to the housing of the receptacle in this state, the output voltage from the DC-DC converter is not applied between the power supply terminal of the receptacle and the housing of the receptacle. For this reason, the switch circuit is turned off to stop the enable signal for the DC-DC converter from being output. This brings the DC-DC converter into a state where operation is stopped or quiescent. Thus, in the charging device without the electronic device connected via the cable, the DC-DC converter consumes little power even when the charging device is left connected to the commercial AC power supply.

As described above, according to the fourth aspect of the present disclosure, the operational effect of allowing provision of a charging device low in wasteful power consumption is achieved.

A charging device according to a fifth aspect of the present disclosure is the charging device according to the aforementioned fourth aspect, wherein the switch circuit includes a photocoupler, a light-emitting diode of the photocoupler emits light upon receiving current flowing due to the difference in potential between the power supply terminal of the receptacle and the housing of the receptacle, and the control circuit outputs the enable signal for the DC-DC converter when a phototransistor of the photocoupler is on.

According to the fifth aspect of the present disclosure, the same operational effect as that of the aforementioned second aspect of the present disclosure is achieved.

As for a charging device according to a sixth aspect of the present disclosure, in the aforementioned fifth aspect of the present disclosure, the charging circuit includes a first field-effect transistor, a second field-effect transistor, and a charging control unit which performs on-off control on the first field-effect transistor and the second field-effect transistor in accordance with a charging status of the secondary battery, a source of the first field-effect transistor being connected to an output of the DC-DC converter, a source of the second field-effect transistor being connected to the power supply terminal of the receptacle, and a drain of the first field-effect transistor being connected to a drain of the second field-effect transistor, and the light-emitting diode of the photocoupler has an anode connected to a juncture of the drain of the first field-effect transistor and the drain of the second field-effect transistor and a cathode connected to the housing of the receptacle.

As described above, according to the sixth aspect of the present disclosure, the same operational effect as that of the aforementioned third aspect of the present disclosure is achieved.

As for a charging device according to a seventh aspect of the present disclosure, in any one of the charging devices according to the aforementioned first to sixth aspects of the present disclosure, the control circuit further includes an activation circuit which generates and outputs the enable signal only for a predetermined time period after the rectifier circuit is activated.

For example, if the AC power supply is reconnected to reactivate the rectifier circuit after the AC power supply is temporarily disconnected, the enable signal is output from the activation circuit only for the predetermined time period, which activates the DC-DC converter. After the DC-DC converter is activated, the enable signal can be maintained with the output voltage from the DC-DC converter, as described earlier. Thus, even in, for example, a case where power of the secondary battery is almost depleted, the voltage of the secondary battery is low, and the switch circuit cannot be turned on with the voltage of the secondary battery, it is possible to activate the DC-DC converter and charge the secondary battery.

As for a charging device according to an eighth aspect of the present disclosure, in the aforementioned seventh aspect of the present disclosure, the activation circuit includes an RC circuit to which an output voltage from the rectifier circuit is applied and a transistor which is turned on upon receiving base current flowing only for a period from when the rectifier circuit is activated to when a capacitor of the RC circuit is charged, and which outputs the enable signal for the DC-DC converter when the transistor is on.

According to the eighth aspect of the present disclosure, since the activation circuit is composed of an extremely simple circuit, it is possible to implement a charging device according to the present disclosure at lower cost.

EXPLANATION OF REFERENCE SIGNS 10 rectifier circuit
20 DC-DC converter
30 charging circuit
40 control circuit
41 activation circuit
100 charging device

The invention claimed is:

1. A charging device comprising:
a rectifier circuit which rectifies AC power output by an AC power supply;
a DC-DC converter which converts a voltage of DC power output by the rectifier circuit;
a charging circuit which includes a positive electrode contact point in contact with a positive electrode terminal of a mounted secondary battery, and a first negative electrode contact point and a second negative electrode contact point in contact with a negative electrode terminal of the secondary battery, an output voltage from the DC-DC converter being applied between the positive electrode contact point and the first negative electrode contact point; and
a control circuit which includes a switch circuit that is turned on by a difference in potential between the positive electrode contact point and the second negative electrode contact point and outputs an enable signal for the DC-DC converter when the switch circuit is on.

2. The charging device according to claim 1, wherein the switch circuit includes a photocoupler, and a light-emitting diode of the photocoupler emits light upon receiving current flowing due to the difference in potential between the positive electrode contact point and the second negative electrode contact point, and
the control circuit outputs the enable signal for the DC-DC converter when a phototransistor of the photocoupler is on.

3. The charging device according to claim 2, wherein the charging circuit includes a first field-effect transistor, a second field-effect transistor, and a charging control unit which performs on-off control on the first field-effect transistor and the second field-effect transistor in accordance with a charging status of the secondary battery, a source of the first field-effect transistor being connected to an output of the DC-DC converter, a source of the second field-effect transistor being connected to the positive electrode contact point, and a drain of the first field-effect transistor being connected to a drain of the second field-effect transistor, and
the light-emitting diode of the photocoupler has an anode connected to a juncture of the drain of the first field-effect transistor and the drain of the second field-effect transistor and a cathode connected to the second negative electrode contact point.

4. The charging device according to claim 1, wherein the control circuit further includes an activation circuit which generates and outputs the enable signal only for a predetermined time period after the rectifier circuit is activated.

5. The charging device according to claim 4, wherein the activation circuit includes an RC circuit to which an output voltage from the rectifier circuit is applied and a transistor which is turned on upon receiving base current flowing only for a period from when the rectifier circuit is activated to when a capacitor of the RC circuit is charged, and which outputs the enable signal for the DC-DC converter when the transistor is on.

* * * * *